(12) United States Patent
Homma et al.

(10) Patent No.: US 11,829,000 B2
(45) Date of Patent: Nov. 28, 2023

(54) OPTICAL APPARATUS, ITS CONTROL METHOD, AND STORAGE MEDIUM

(71) Applicant: CANON KABUSHIKI KAISHA, Tokyo (JP)

(72) Inventors: Taiki Homma, Utsunomiya (JP); Satoshi Maruyama, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 435 days.

(21) Appl. No.: 17/026,866

(22) Filed: Sep. 21, 2020

(65) Prior Publication Data
US 2021/0109313 A1    Apr. 15, 2021

(30) Foreign Application Priority Data
Oct. 9, 2019 (JP) .................................. 2019-185698

(51) Int. Cl.
*G02B 7/09* (2021.01)
*G02B 7/10* (2021.01)
*G02B 7/14* (2021.01)

(52) U.S. Cl.
CPC ................. *G02B 7/09* (2013.01); *G02B 7/10* (2013.01); *G02B 7/14* (2013.01)

(58) Field of Classification Search
CPC ... G02B 7/09; G02B 7/10; G02B 7/14; G02B 7/102; H04N 23/54; H04N 23/672; H04N 23/69
See application file for complete search history.

(56) References Cited

U.S. PATENT DOCUMENTS

2021/0352215 A1* 11/2021 Kim .......................... G02B 7/30

FOREIGN PATENT DOCUMENTS

| JP | H03-200907 A | 9/1991 |
| JP | 2010-092035 A | 4/2010 |
| JP | 2013-057867 A | 3/2013 |
| JP | 2014-16513 A | 1/2014 |

OTHER PUBLICATIONS

Notice of Reasons for Rejection issued by the Japanese Patent Office dated Jul. 25, 2023 in corresponding JP Patent Application No. 2019-185698, with English translation.

* cited by examiner

*Primary Examiner* — James C. Jones
(74) *Attorney, Agent, or Firm* — Carter, DeLuca & Farrell LLP

(57) ABSTRACT

An optical apparatus includes a first driver configured to move a focus lens in an optical axis direction, a second driver configured to move a first driver in the optical axis direction, and a controller configured to control driving of the first driver according to a moving amount of the first driver by the second driver.

14 Claims, 12 Drawing Sheets

OPTICAL APPARATUS, ITS CONTROL METHOD, AND STORAGE MEDIUM

BACKGROUND OF THE INVENTION

Field of the Invention

The present invention relates to an optical apparatus that provides zooming and focusing by moving a lens.

Description of the Related Art

An inner focus type zoom lens changes an image plane position by moving a magnification varying lens during zooming. Therefore, a control is made to move a focus lens so as to maintain an in-focus state for an object during zooming. Japanese Patent Laid-Open No. 2014-16513 discloses a method of improving moving followability (focus followability) of the focus lens relative to the movement of the magnification varying lens.

Some lens apparatuses move a focus motor that moves the focus lens during zooming. In this configuration, the focus lens is moved by the sum of a moving amount of the focus motor and a moving amount of the focus lens by the focus motor. The focus motor is moved using, for example, a cam that rotates around the optical axis.

In the lens apparatus that moves the focus motor, the moving amount of the focus lens obtained from a position detection system that detects the position of the focus lens corresponding to the sum of the moving amounts and the moving amount of the focus lens by the focus motor are different from each other. It is thus difficult to make a control so as to match the moving speed of the focus lens to the moving speed of the magnification varying lens. As a result, the focus followability relative to the movement of the magnification varying lens may deteriorate.

SUMMARY OF THE INVENTION

The present invention provides an optical apparatus that moves a motor in addition to a lens, such as a focus lens, through the motor, and can satisfactorily control driving of the motor.

An optical apparatus according to one aspect of the present invention includes a first driver configured to move a focus lens in an optical axis direction, a second driver configured to move a first driver in the optical axis direction, and a controller configured to control driving of the first driver according to a moving amount of the first driver by the second driver.

A control method according to another aspect of the present invention of an optical apparatus that includes a first driver configured to move a focus lens in an optical axis direction, and a second driver configured to move the first driver in the optical axis direction includes the steps of acquiring a moving amount of the first driver by the second driver, and controlling driving of the first driver according to the moving amount of the first driver by the second driver.

A non-transitory computer-readable storage medium storing a computer program that causes a computer in the optical apparatus to execute the above control method also constitutes another aspect of the present invention.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1:
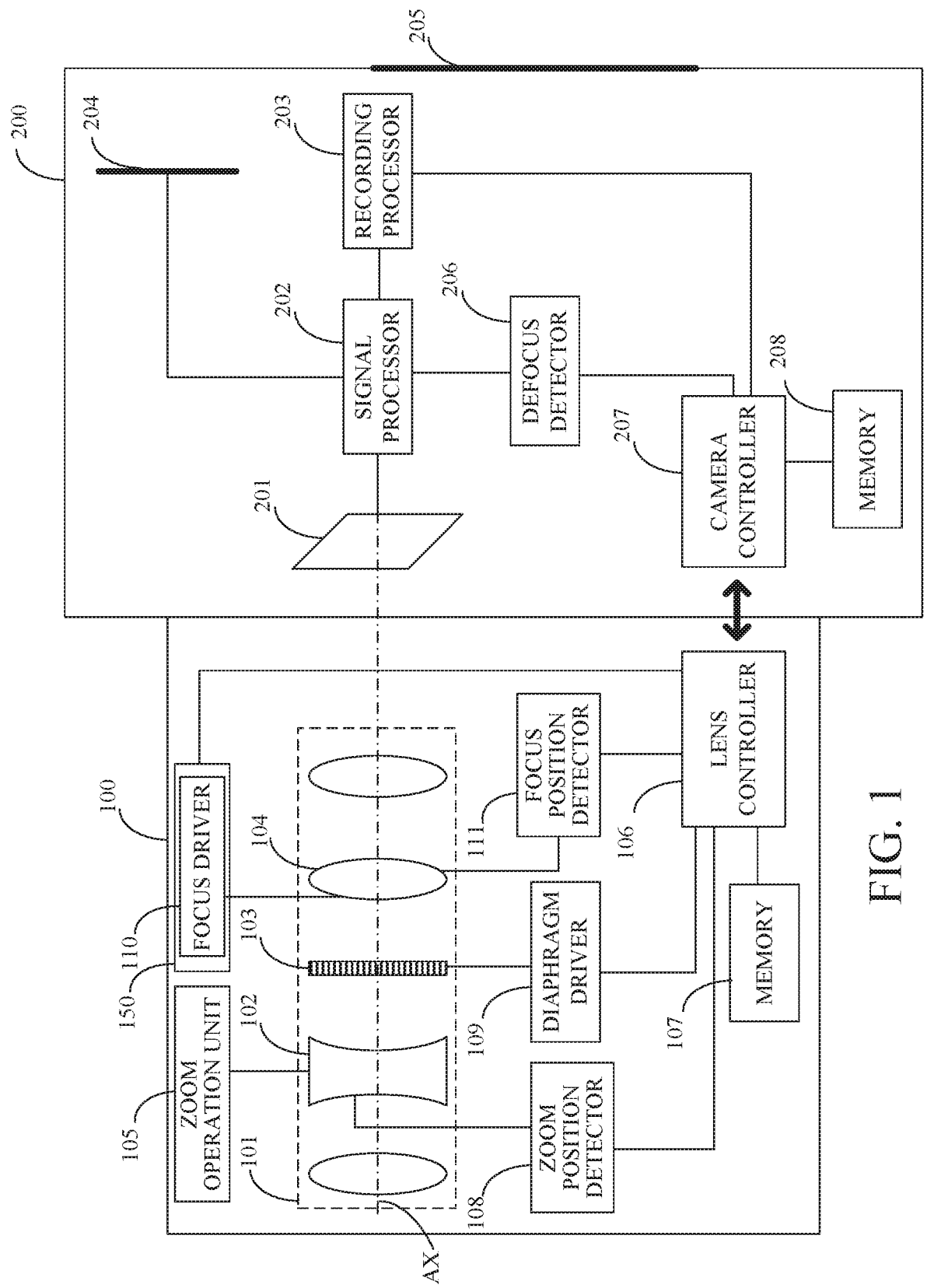
FIG. 1 is a block diagram illustrating a configuration of a lens interchangeable camera system according to a first embodiment of the present invention.

FIG. 1 illustrates a configuration of an interchangeable lens type camera system according to a first embodiment of the present invention. This interchangeable lens type camera system includes an interchangeable lens 100 as an optical apparatus and a camera body 200 as an image pickup apparatus to which the interchangeable lens 100 is detachably mounted, and can capture a still image and a motion image.

The interchangeable lens 100 includes an imaging optical system 101 that forms an object image on an image sensor 201 in the camera body 200, a zoom operation unit 105 for a user to perform a magnification changing operation, and a lens controller 106 that can communicate with a camera controller 207 in the camera body 200. The imaging optical system 101 includes, in order from an object side to an image side, a magnification varying lens 102, a diaphragm (aperture stop) 103, and a focus lens 104. In the following description, a direction in which an optical axis AX of the imaging optical system 101 extends is called the optical axis direction.

The magnification varying lens 102 moves in the optical axis direction of the imaging optical system when the user rotates the zoom operation unit 105 as an operation ring around the optical axis AX, and changes a focal length of the imaging optical system (or performs a magnification variation). More specifically, due to the rotation of the zoom operation unit 105, an unillustrated zoom cam ring rotates around the optical axis AX, and the zoom lens 102 moves in the optical axis direction by a cam (groove) part provided in the zoom cam ring.

The focus lens 104 is controlled and moved according to zoom-focus position data, which will be described later, as the magnification varying lens 102 moves. The imaging optical system according to this embodiment is an inner focus (rear focus) type zoom lens, and the image plane position is changed by the movement (zooming) of the magnification varying lens 102, and an image becomes out of focus. Thus, the lens controller 106 controls the position of the focus lens 104 using the zoom-focus position data in order to correct the fluctuations of the image plane position during zooming (to correct the focus).

At this time, the focus lens 104 is moved by a focus driver (first driver) 110, and the focus driver 110 is moved by a focus cam mechanism (second driver) 150 driven by the rotation of the zoom operation unit 105. In other words, a moving amount of the focus lens 104 is expressed by the sum of its moving amount by the focus driver 110 and a moving amount of the focus driver 110 by the focus cam mechanism 150. This configuration shortens a driving range of the focus lens 104 by the focus driver 110, and consequently an overall length of the interchangeable lens 100.

While this embodiment describes that the rotation of the zoom operation unit 105 is mechanically transmitted to the magnification varying lens 102 and the magnification varying lens 102 moves, but the rotation of the zoom operation unit 105 may be detected and the magnification varying lens 102 may be moved by a motor according to the detection.

The lens controller 106 is a computer including a CPU and an internal memory. The lens controller 106 is electrically connected to a memory 107, a zoom position detector 108, a diaphragm driver 109, a focus driver 110, and a focus position detector 111.

The memory 107 as a storage unit includes a ROM, a RAM, etc., and stores various information and data. The zoom-focus position data (first data) is stored in the memory 107. The zoom-focus position data is, as will be described later with reference to FIG. 4, data relating to the in-focus position of the focus lens 104 corresponding to the position of the variable magnification lens 102 for each object distance (the position of the focus lens 104 that provides the in-focus position for the object distance). The zoom-focus position data may be data that directly represents the in-focus position, data that can be converted into the in-focus position, or any data relating to the in-focus position.

The zoom position detector 108 detects the position of the variable magnification lens 102 (referred to as a zoom position hereinafter) using the position sensor such as a variable resistor, and outputs a zoom position signal indicating the zoom position to the lens controller 106. The lens controller 106 acquires the zoom position from the zoom position signal. The zoom position detected by the zoom position detector 108 may be the actual position of the magnification varying lens 102 or the rotational position of the zoom operation unit 105.

The diaphragm driver 109 includes an electric actuator, such as a stepping motor or a voice coil motor, and drives the diaphragm 103 so that its aperture diameter changes. The diaphragm driver 109 includes a diaphragm sensor that detects a driving position of the diaphragm 103 such as a Hall element.

The focus driver 110 includes an electric actuator, such as a stepping motor. a vibration type motor, and a voice coil motor, and drives the focus lens 104 in the optical axis direction.

The focus position detector 111 includes a position sensor such as an encoder, detects the position of the focus lens 104, and outputs a focus position signal indicating the position to the lens controller 106. The lens controller 106 can acquire the position of the focus lens 104 (referred to as a focus position hereinafter) from the focus position signal. The focus position detected by the focus position detector 111 is a position moved by both the focus driver 110 and the focus cam mechanism 150. In other words, the focus position detected by the focus position detector 111 is a position corresponding to the sum of the moving amount by the focus driver 110 and the moving amount of the focus driver 110 by the focus cam mechanism 150. A detailed description will be given later of a relationship among the focus lens 104, the focus driver 110, and the focus position detector 111 with reference to FIG. 2.

The camera body 200 has an image sensor 201, a signal processor 202, a recording processor 203, an electronic viewfinder 204, a display unit 205, a defocus detector 206, a camera controller 207, and a memory 208. The image sensor 201 photoelectrically converts (captures) an object image formed by the imaging optical system 101, and outputs an imaging signal to the signal processor 202. The image sensor 201 has focus detecting pixels for generating a focus detection signal, in addition to imaging pixels for generating an imaging signal.

The signal processor 202 performs various processing such as an A/D conversion, an amplification, a noise removal, and a color correction, for the input imaging signal to generate image data, and outputs this signal to the recording processor 203. The recording processor 203 records image data. The electronic viewfinder 204 and the display unit 205 display an image corresponding to the image data.

The defocus detector 206 calculates a defocus amount of the object image (imaging optical system) by a phase difference detecting method using the focus detection signals (a pair of image signals) obtained from the focus detection pixels on the image sensor 201, and outputs data of the defocus amount to the camera controller 207.

The camera controller 207 is a computer having a CPU, an internal memory, and the like, and is electrically connected to the recording processor 203, the defocus detector 206, and the memory 208. The camera controller 207 reads a computer program recorded in the memory 208, executes various processing in accordance with the computer program, and communicates data necessary for image capturing with the lens controller 106. The camera controller 207 calculates the driving amount of the focus lens 104 for focusing on the object from the defocus amount from the defocus detector 206 and the position of the focus lens 104 received from the lens controller 106. Then, the focus command including the driving amount is transmitted to the lens controller 106. The lens controller 106 causes the focus driver 110 to drive the focus lens 104 according to the focus command. Thereby, autofocusing (AF) is performed.

While the AF of the phase difference detecting method using the focus detection signal has been described, the AF of the contrast detecting method using the imaging signal may be performed.

Figure 2:
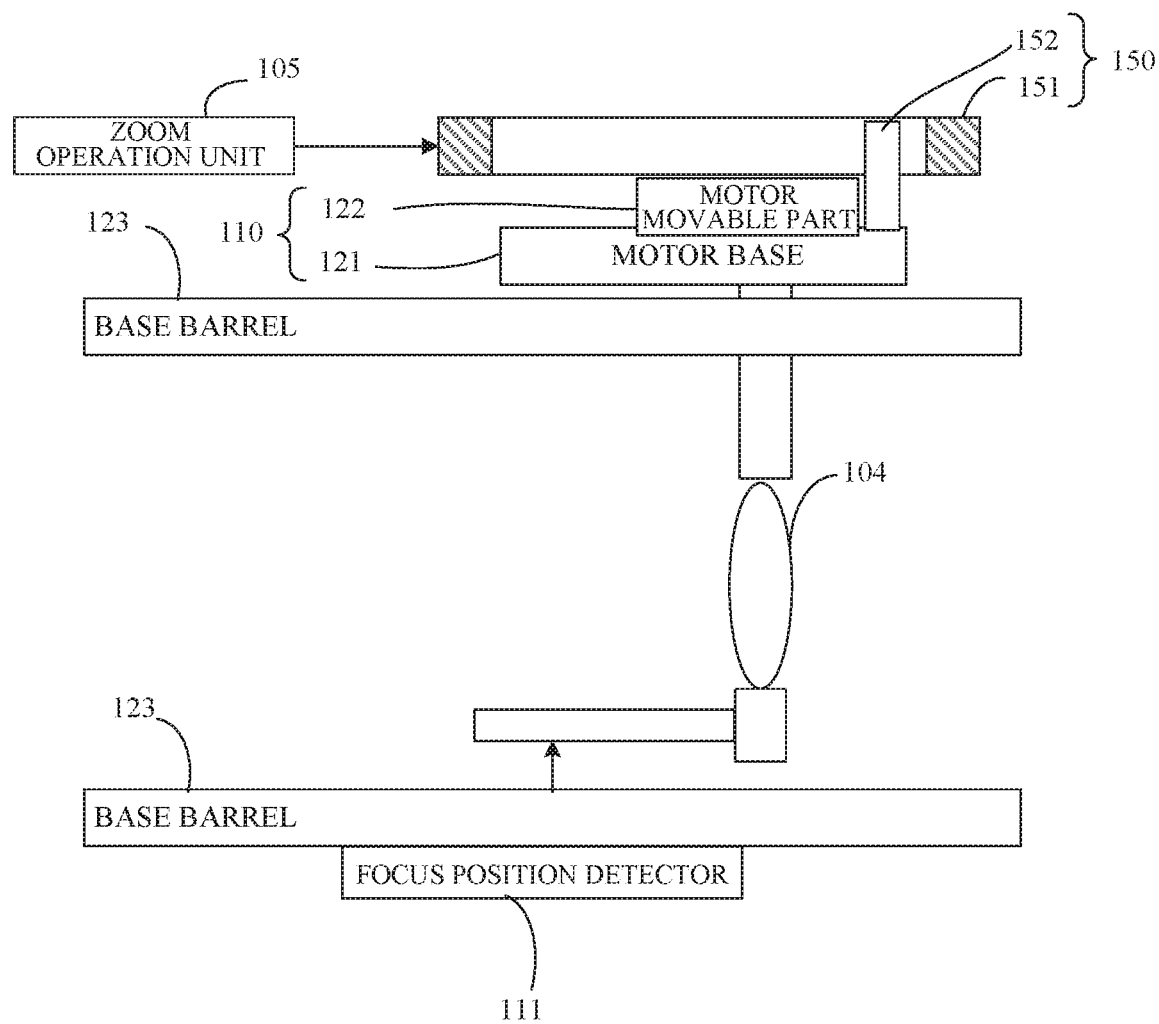
FIG. 2 illustrates a relationship among a focus lens, a focus driver, and a focus position detector according to the first embodiment.

FIG. 2 illustrates a relationship among the focus lens 104, the focus driver 110, and the focus position detector 111. The focus driver 110 includes a motor base part 121 and a motor movable part 122. A cam follower 152 provided on the motor base part 121 is engaged with a cam groove part (not shown) formed in a focus cam ring 151. When the zoom operation unit 105 shown in FIG. 1 is rotated, the focus cam ring 151 rotates around the optical axis AX. The cam groove part is formed so as to have an inclination to the optical axis direction, and the focus driving portion 110 (motor base part 121) and the focus lens 104 are integrally moved in the optical axis direction via the cam follower 152 by the rotation of the focus cam ring 151. The cam ring 151 and the cam follower 152 constitute the focus cam mechanism 150.

In the following description, moving the focus driver 110 and the focus lens 104 by the focus cam mechanism 150 will be called cam driving, and a moving amount of the focus driver 110 and the focus lens 104 by the cam driving will be called a cam moving amount.

The focus driver 110 moves the motor movable part 122 relative to the motor base part 121 according to the motor driving command value output from the lens controller 106 for the above focus corrections during zooming. Thereby, the focus lens 104 held by the motor movable part 122 moves. In the following description, moving the focus lens 104 by the focus driver 110 will be referred to as motor driving, and a moving amount of the focus lens 104 by the motor driving will be referred to as a motor moving amount.

The focus position detector 111 is fixed onto a base barrel 123. The focus position detector 111 and the base barrel 123 are not moved by the focus cam mechanism 150 even if the zoom position changes. However, the focus position detector 111 and the base barrel 123 may move on a moving locus different from that of the focus lens 104 driven by the cam.

In such a configuration, the moving amount of the focus lens 104 detected by the focus position detector 111 during zooming is different from the motor moving amount. Hence, if the focus lens 104 is driven only by the motor driving for all the moving amounts necessary for the focus corrections during zooming, the focus lens 104 cannot be moved to an appropriate in-focus position. This embodiment properly controls the focus driver 110 in order to move the focus lens 104 to the appropriate in-focus position.

Figure 3:
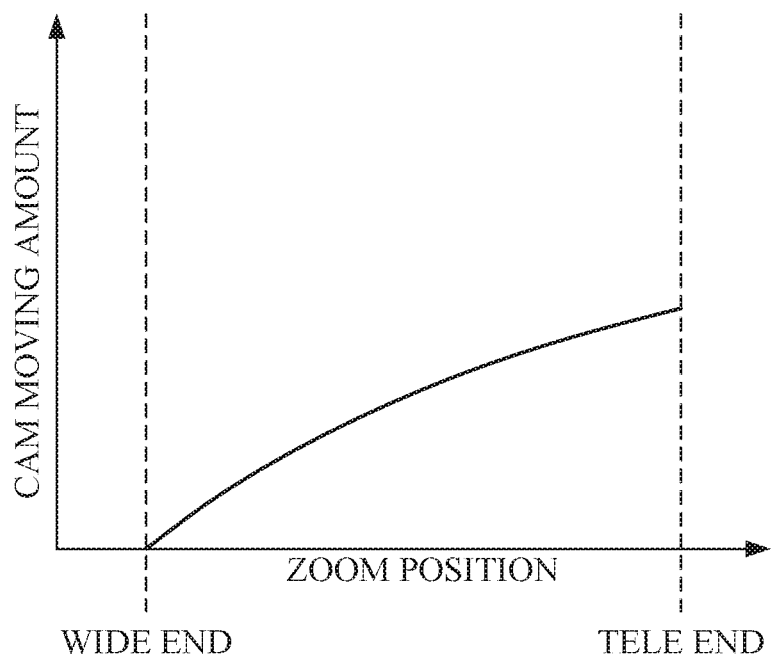
FIG. 3 illustrates a moving amount of a focus lens by a cam mechanism according to the first embodiment.

FIG. 3 illustrates a relationship between the zoom position and the cam moving amount. The abscissa axis represents the zoom position between the wide-angle (WIDE) end and the telephoto (TELE) end, and the ordinate axis represents the moving amount (cam moving amount herein) of the focus lens 104 from the position at the wide-angle end detected by the focus position detector 111. The memory 107 stores data of the cam moving amount (third data: referred to as zoom-cam moving amount data hereinafter) corresponding to the zoom position shown in this figure.

The zoom-cam moving amount data in FIG. 3 is continuous curve data, but the present invention is not limited to this example. The zoom-cam moving amount data may be calculated by storing discrete cam moving amounts at a plurality of representative zoom positions, and by finding a cam moving amount at a zoom position other than the representative zooms position through interpolations using the cam moving amounts at neighboring representative zoom positions. Alternatively, a cam moving amount at a zoom position other than the representative zoom positions may be calculated using an approximation function that approximates the cam moving amounts at the plurality of representative zoom positions. In other words, the zoom-cam moving amount data may be data relating to the cam moving amount.

Figure 4:
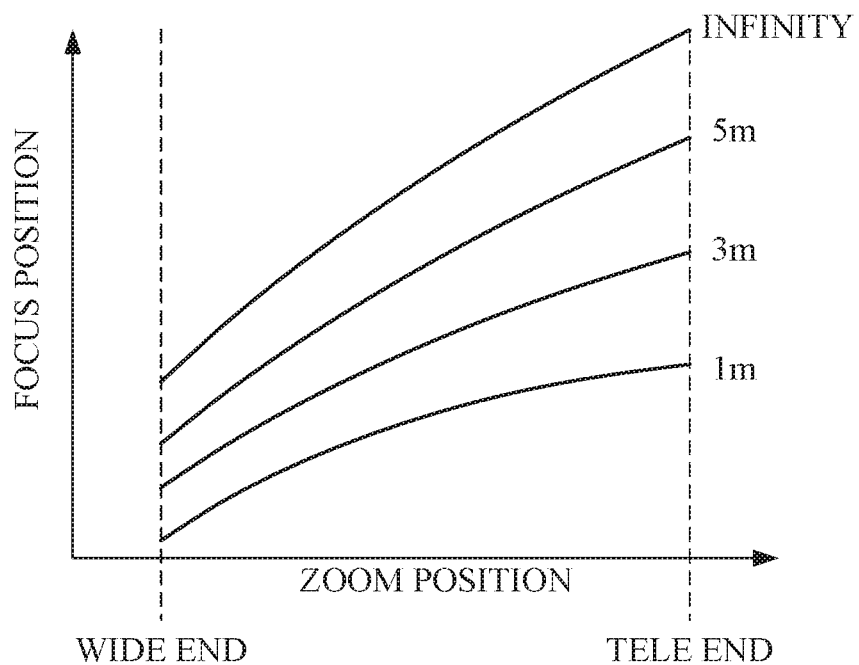
FIG. 4 illustrates zoom-focus position data according to the first embodiment.

FIG. 4 illustrates a specific example of the zoom-focus position data. The abscissa axis represents a zoom position and the ordinate axis represents a focus position. Each of the plurality of curves indicates an in-focus position of the focus lens 104 for maintaining the in-focus state corresponding to the zoom position for each of different representative object distances (such as infinity, 5 m, 3 m, and 1 m). The memory 107 stores the zoom-focus position data for each of the plurality of representative object distances.

Figures 5A, 5B:
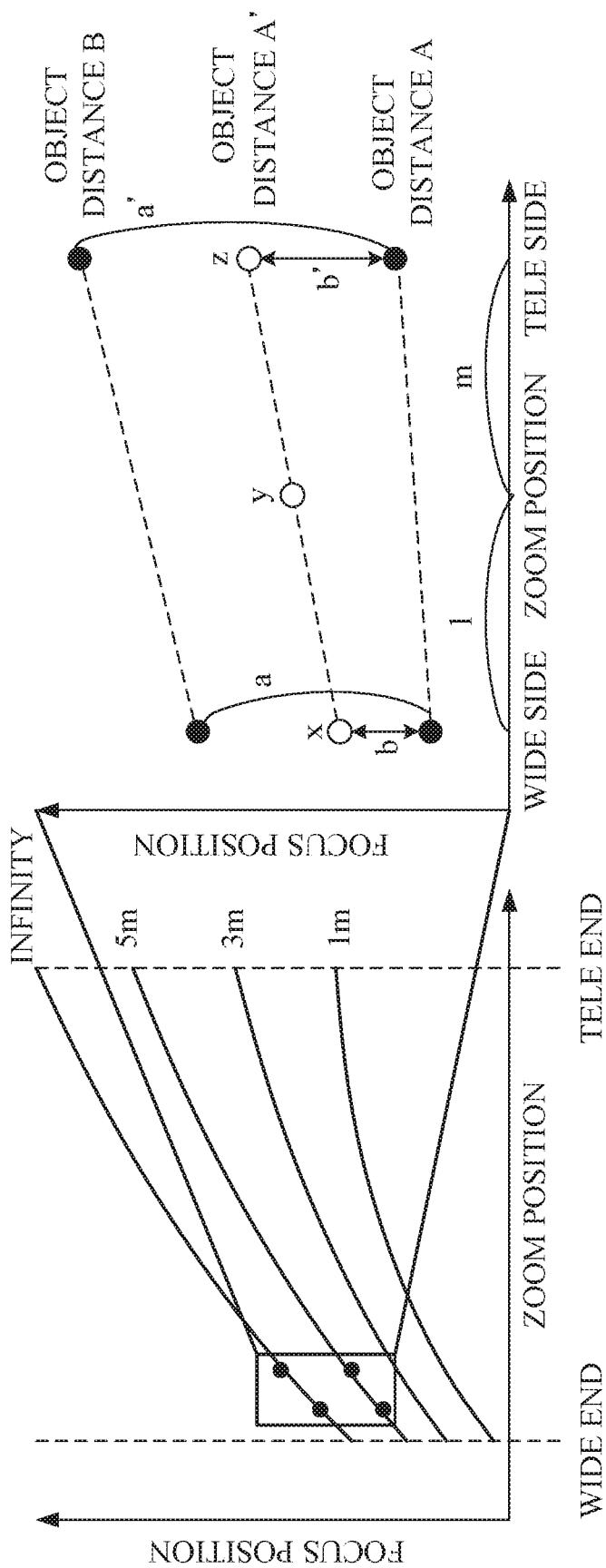
FIGS. 5A and 5B explain a method of calculating an in-focus position of the focus lens according to the first embodiment.

When the object distance coincides with the representative object distance, the in-focus position that is the target position to which the focus lens 104 should be moved can be acquired by reading out the in-focus position corresponding to the representative object distance and the zoom position. For an object distance other than the representative object distance, an in-focus position as the target position can be acquired by the interpolation (linear interpolation) using a plurality of in-focus positions corresponding to two representative object distances near the object distance. FIGS. 5A and 5B illustrate the linear interpolation of the in-focus position.

In FIGS. 5A and 5B, the abscissa axis indicates the zoom position and the ordinate axis indicates the focus position. FIG. 5A illustrates the entire zoom-focus position data, and FIG. 5B illustrates an enlarged portion of the zoom-focus position data shown in FIG. 5A enclosed by a frame. A description will now be given of finding an in-focus position at a zoom position y between a wide-angle side zoom position x and a telephoto side zoom position z at an object distance A' between representative object distances A and B.

First, the in-focus position for the representative object distance A and the in-focus position for the representative object distance B at the wide-angle side zoom position x are read out of the zoom-focus position data, and a ratio b/a is calculated between a difference "a" between the representative object distances A and B and a difference "b" between object distances A and A'. Then, the in-focus position at the object distance A' for the wide-angle side zoom position x is calculated using these focus positions and the ratio b/a.

Similarly, the in-focus position at the representative object distance A and the in-focus position at the representative object distance B at the telephoto side zoom position z are read out of the zoom-focus position data. A ratio b'/a' between a difference "a'" between the representative object distances A and B and a difference "b'" between the object distances A and A' is the same as the ratio b/a. Then, the in-focus position at the telephoto side zoom position z for the object distance A' is calculated using these focus positions and the ratio b'/a' (=b/a).

Next, a zoom moving amount l that is a difference between the zoom position x and the zoom position y and a zoom moving amount m that is a difference between the zoom position y and the zoom position z are calculated. Then, the in-focus position is calculated at the zoom position y for the object distance A' using the in-focus positions at the wide-angle side and telephoto side zoom positions x and z for the object distance A' and the above distance ratio l/(l+m).

The memory 107 may store the zoom-focus position data including a plurality of representative zoom positions and in-focus positions at which the above curve can be drawn by the approximation.

Figure 6:
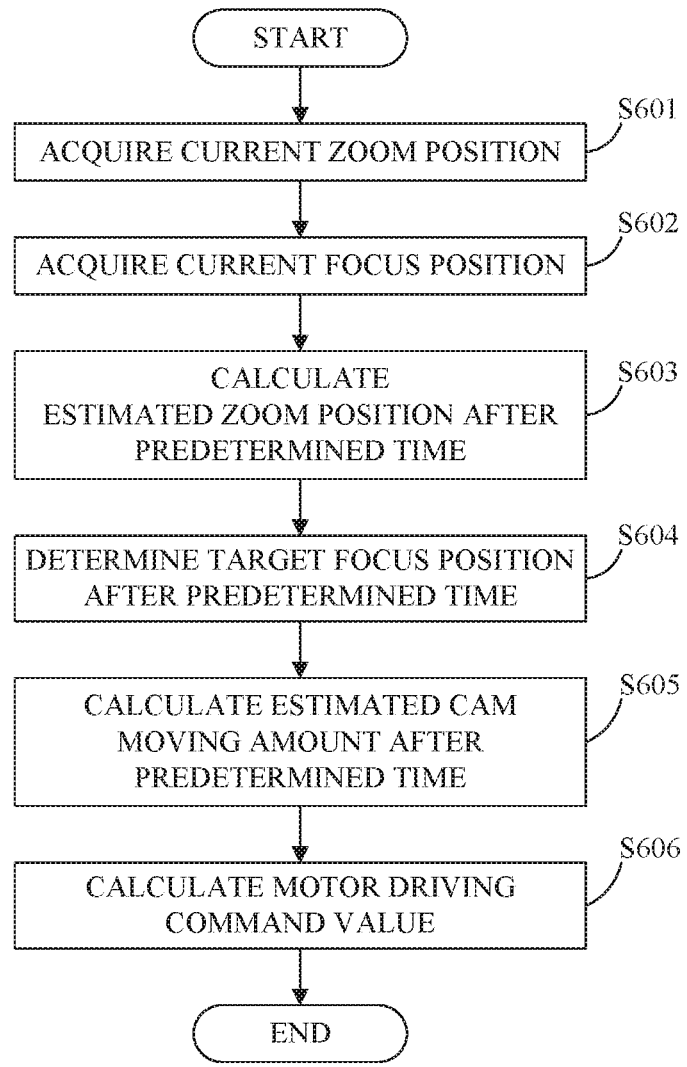
FIG. 6 is a flowchart showing processing of calculating a motor driving command value according to the first embodiment.

The flowchart in FIG. 6 shows processing in which the lens controller 106 calculates a motor driving command value for the focus correction during zooming. The lens controller 106 as a computer executes this processing according to a computer program. The lens controller 106 serves as a controller and a moving amount acquirer.

First, in the step S601, the lens controller 106 acquires the current zoom position detected by the zoom position detector 108, and stores it in the memory 107.

Next, in the step S602, the lens controller 106 acquires the current focus position detected by the focus position detector 111.

Next, in the step S603, the lens controller 106 determines (acquires) the estimated zoom position that is an estimated position of the zoom position a predetermined time after the current time, using the current zoom position acquired in the step S601 and the past zoom position stored in the memory 107. A method of calculating the estimated zoom position will be described later with reference to FIGS. 7A and 7B. The predetermined time is a control period (first control period) that is a time period necessary for the lens controller 106 to calculate the motor driving command value next time. It is now assumed that the actual zoom position acquiring interval for calculating the estimated zoom position is equal to the first control period, but the actual zoom position acquiring interval and the first control period may be different from each other.

Next, in the step S604, the lens controller 106 determines, based on the estimated zoom position and the zoom-focus position data (FIG. 4) stored in the memory 107, the target focus position (first target focus position) that is expected to be an in-focus position of the focus lens 104 after the predetermined time passes.

Next, in the step S605, the lens controller 106 calculates the estimated cam moving amount (first moving amount) that is predicted to be a moving amount after the predetermined time passes, using the zoom position that is estimated to be a zoom position after the predetermined time passes in the step S603 and the zoom-cam moving amount data (FIG. 3) stored in the memory 107.

Next, in the step S606, the lens controller 106 calculates a motor driving command value. The motor driving command value includes a motor driving amount and a speed at which the focus lens 104 moves by the motor driving amount (referred to as a motor driving speed hereinafter). The motor driving amount and the motor driving speed are calculated using the current focus position acquired in the step S602, the target focus position determined in the step S604, and the estimated cam moving amount calculated in the step S605. Ten, this processing ends.

Figure 7A:
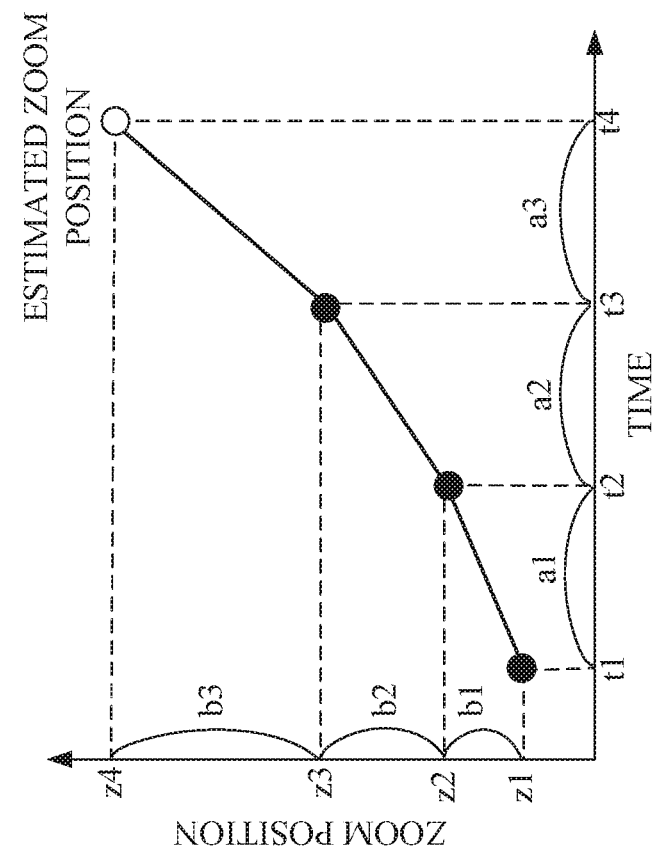
FIGS. 7A and 7B explain a method of calculating an estimated zoom position according to the first embodiment.
Figure 7B:
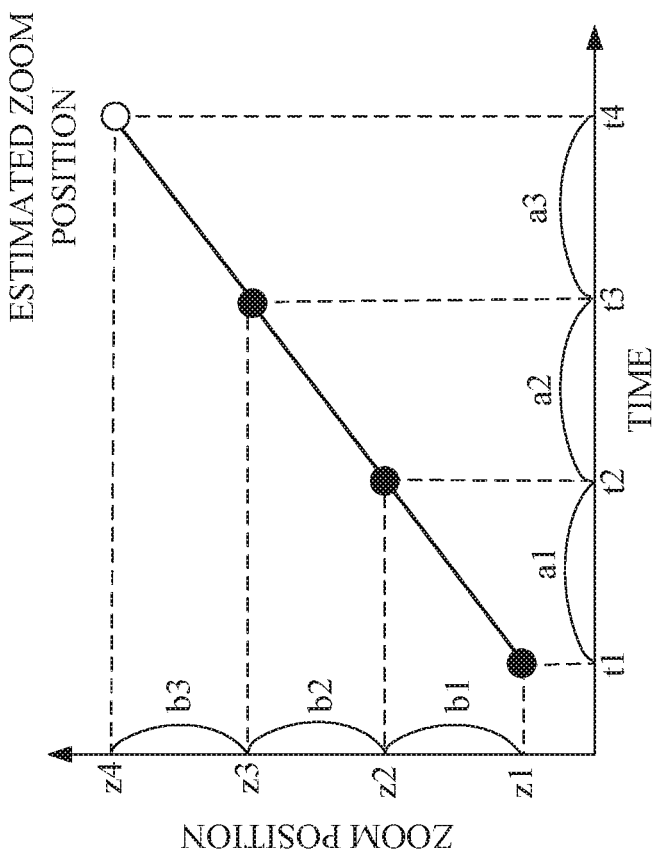

FIGS. 7A and 7B illustrate how the lens controller 106 calculates the estimated zoom position in the step S603. The ordinate axis represents the zoom position and the abscissa axis represents time. This figure illustrates an example in which an estimated zoom position z4 at time t4 is calculated using zoom positions z1, z2, and z3 detected at times t1, t2, and t3, respectively. Each black dot in the figure shows the time and zoom position as an actual value, and each white dot shows the time and the zoom position as an estimated value.

FIG. 7A illustrates an example in which the moving speed of the magnification varying lens 102 (referred to as the zoom speed hereinafter) insignificantly changes. For example, when a difference between a zoom speed (b1/a1) from time t1 to time t2 and a zoom speed (b2/a2) from time t2 to time 3 is equal to or smaller than a predetermined threshold, the lens controller 106 determines that the zoom speed little changes. When the zoom speed little changes, the lens controller 106 calculates the estimated zoom position on the assumption that the last zoom speed is maintained. For example, it calculates the estimated zoom position z4 at time t4 using the following expression (1):

$$z4 = z3 + (b2/a2) \times a3 \quad (1)$$

FIG. 7B illustrates an example in which the zoom speed significantly changes. For example, when a difference between a zoom speed (b1/a1) from time t1 to time t2 and a zoom speed (b2/a2) from time t2 to time 3 is larger than the predetermined threshold, the lens controller 106 determines that the zoom speed significantly changes. When the zoom speed significantly changes, the lens controller 106 calculates the estimated zoom position on the assumption that the last changing amount of the zoom speed (referred to as a zoom acceleration hereinafter) is maintained. For example, it calculates a moving amount (referred to as a zoom moving amount hereinafter) b3 of the magnification varying lens 102 from time 3 to time t4 using the following expression (2).

$$(b3/a3) = (b2/a2) + \{(b2/a2) - (b1/a1)\} \quad (2)$$

The expression (2) is solved for b3, and the estimated zoom position z4 at the time t4 is calculated using the following expression (3).

$$z4 = z3 + b3 \quad (3)$$

An upper limit may be set to the changing amount of the zoom speed in consideration of rapid changes of the zoom speed, for example, when the zoom lens 102 starts moving from a stop state or when the moving direction is reversed. For example, when the zoom speed is rapidly decelerated and the current zoom speed approaches to zero, the moving direction may be reversed after a predetermined time passes but this is not always the case. Then, the zoom speed is estimated to be zero after the predetermined time passes by performing the calculation within a range in which the sign of the zoom speed is not reversed.

The method of calculating the estimated zoom position from the zoom speed and the zoom acceleration has been described here, but the estimated zoom position may be acquired by other methods. For example, when the magnification varying lens 102 is driven by a motor, the estimated zoom position may be acquired by utilizing the fact that there is a certain delay between the zoom driving command value for controlling driving of the motor and the zoom position.

Figure 8:
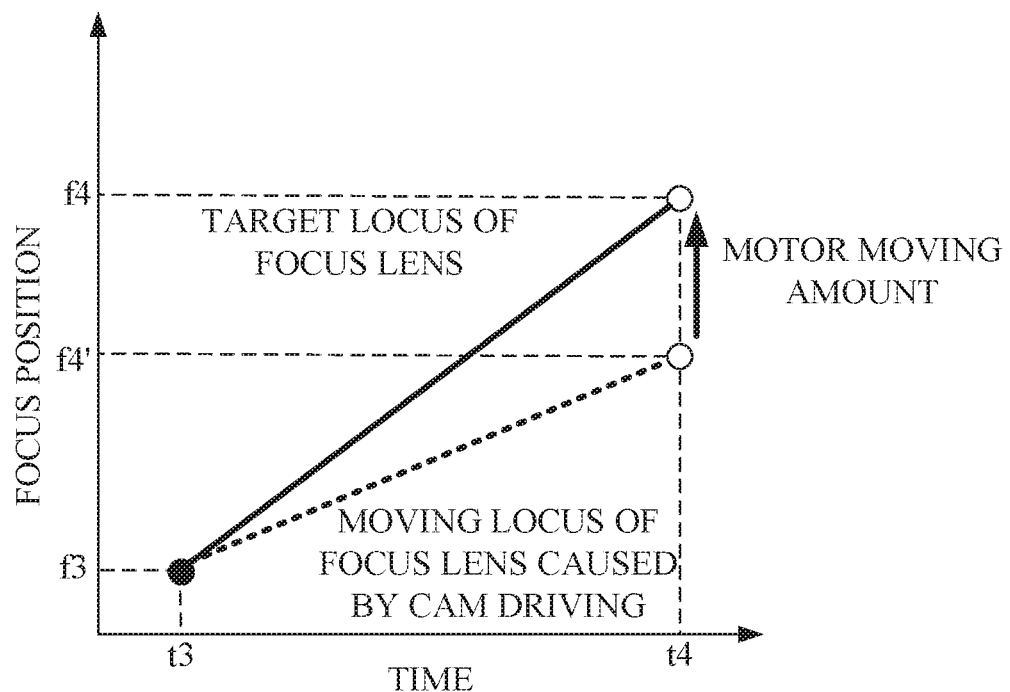
FIG. 8 explains a method of calculating the motor driving command value according to the first embodiment.

FIG. 8 illustrates a method in which the lens controller 106 calculates the motor driving command value in the step S606 in FIG. 6. The abscissa axis represents time and the ordinate axis represents a focus position. Time t3 and time t4 in FIG. 8 are the same as those shown in FIGS. 7A and 7B. A solid line shows a moving locus (target locus) of the focus lens 104 from the focus position at time 3 to the target focus position at time t4, and a broken line is a moving locus of the focus lens 104 driven by the cam from the focus position at time t3 to time t4.

In the flowchart in FIG. 6, the lens controller 106 proceeds to the step S603 at time t3, and calculates the estimated zoom position z4 at time t4 as described in FIGS. 7A and 7B. In the step S604, the lens controller 106 determines as a target focus position f4 a focus position corresponding to the estimated zoom position z4 in the zoom-focus position data stored in the memory 107.

Next, in the step S605, the lens controller 106 calculates a cam moving amount (f4'−f3) from time t3 to time t4 from the zoom-cam moving amount data stored in the memory 107. Then, in the step S606, the lens controller 106 subtracts the cam moving amount (f4'−f3) from the target focus position f4 and calculates a motor moving amount (f4−f4') required from time t3 to time t4. In this way, the motor driving amount and the motor driving speed (=motor driving amount/(t4−t3)) corresponding to the motor moving amount are calculated as the motor driving command value.

According to this embodiment, driving of the focus driver 110 can be properly controlled by subtracting the cam focus cam moving amount from the difference between the current focus position and the target focus position (in-focus position) according to zooming and by calculating the motor driving command value. This configuration can reduce the overall length of the interchangeable lens 100 and suppress a delay in focus correction during zooming.

Second Embodiment

Next follows a description of a second embodiment according to the present invention. In this embodiment, those elements, which are corresponding elements in the first embodiment, will be designated by the same reference numerals.

Figure 9:
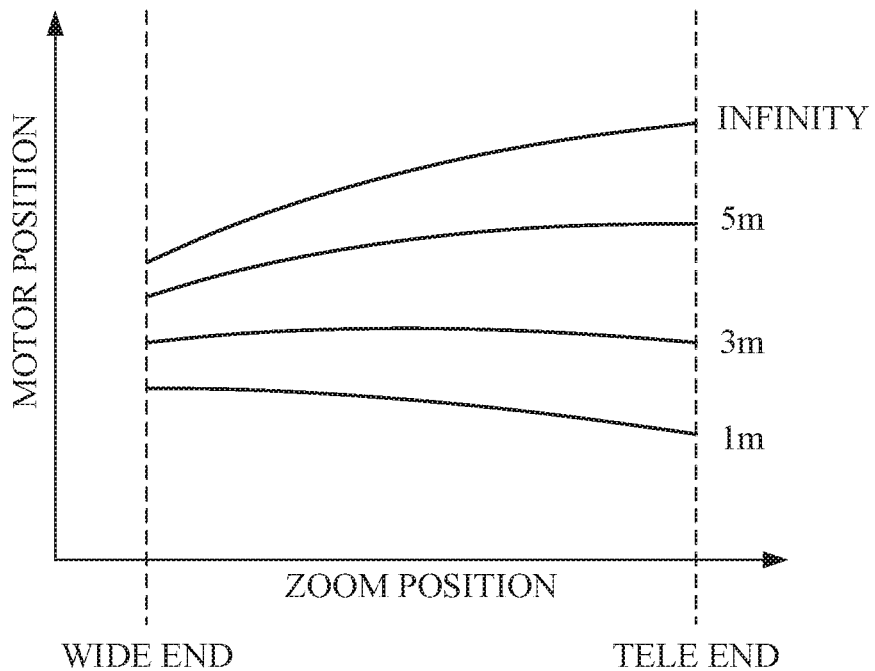
FIG. 9 illustrates zoom-motor position data according to the first embodiment.

FIG. 9 illustrates the in-focus position of the motor movable part 122 corresponding to the zoom position for each object distance. The in-focus position of the motor movable part 122 here is the position of the motor movable part 122 relative to the motor base part 121 when the focus lens 104 is driven to a position where a focused state can be obtained for the zoom position. The abscissa axis in FIG. 9 indicates a zoom position, and the position of the motor movable part 122 relative to the motor base part 121 (referred to as a motor position hereinafter). In other words, the motor position can be said to be the position of the movable portion 122 within a movable range of the motor movable part 122.

Each of a plurality of curves shows the in-focus position of the motor movable part 122 for each of representative object distances (such as infinity, 5 m, 3 m, and 1 m). The memory 107 stores the in-focus position data (second data: referred to as zoom-motor position data hereinafter) of the motor movable part 122 for the plurality of representative object distances instead of the zoom-focus position data shown in FIG. 4.

This zoom-motor position data is obtained using the zoom-focus position data illustrated in FIG. 4 and the cam moving amount data illustrated in FIG. 3. More specifically, the zoom-motor position data, which is the in-focus position data or the motor position is found by subtracting the cam moving amount at the same zoom position illustrated in FIG. 3 from the in-focus position of the focus lens 104 with respect to the zoom position for each object distance illustrated in FIG. 4. The zoom-motor position data may be data that directly indicates the in-focus position, data that can be converted into the in-focus position, or data relating to the in-focus position.

This embodiment can calculate the target driving position of the motor position (target motor position hereinafter) by the same method as the method of calculating the target focus position in the first embodiment.

Figure 10:
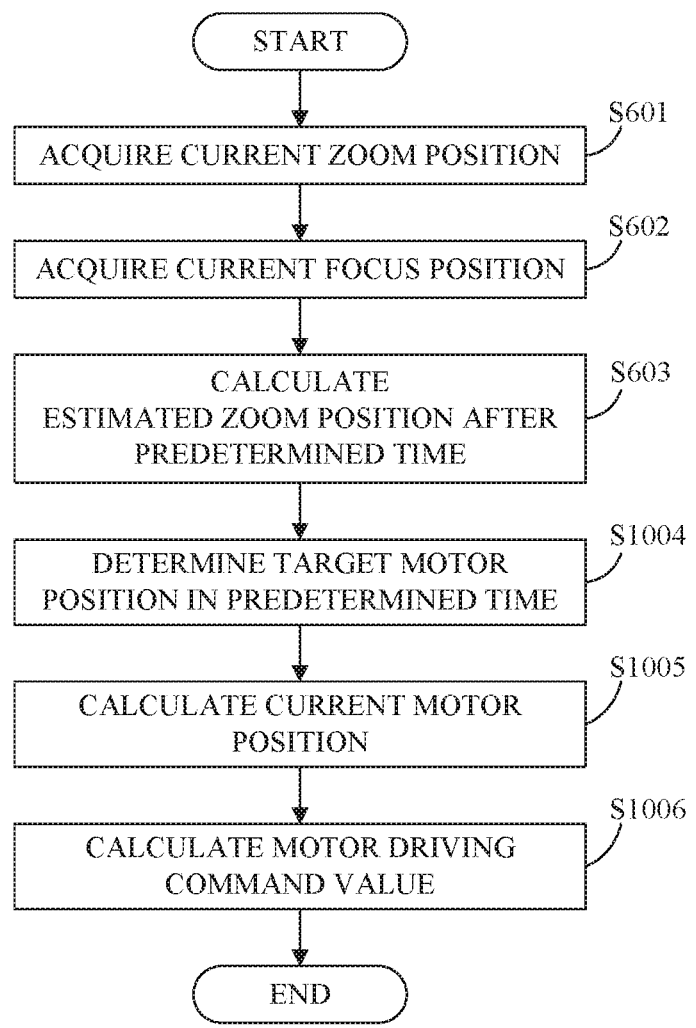
FIG. 10 is a flowchart showing processing of calculating a motor driving command value according to a second embodiment of the present invention.

A flowchart in FIG. 10 shows processing in which the lens controller 106 calculates a motor driving command value for focus corrections during zooming according to this embodiment. The steps S601 to S603 are the same as the steps S601 to S603 illustrated in FIG. 6 in the first embodiment.

In the step S1004, the lens controller 106 determines the target position (first target driving position) of the motor movable part 122 within the movable range of the motor movable part 122, which is estimated to be a position after the predetermined time passes. The first target driving position is determined using the estimated zoom position that is estimated to be a position after the predetermined time passes calculated in the step S603 and the zoom-motor position data stored in the memory 107.

Next, in the step S1005, the lens controller 106 calculates the current motor position using the current zoom position acquired in the step S601, the current focus position acquired in the step S602, and the zoom-cam moving amount data stored in the memory 107. More specifically, the current motor position is calculated by subtracting the cam moving amount corresponding to the current zoom position from the current focus position corresponding to the current zoom position.

In the step S1006, the lens controller 106 calculates the motor driving amount and the motor driving speed as a motor driving command value from a moving amount necessary for the motor movable part 122 obtained by subtracting the current motor position from the target motor position determined in the step S1004. Then, this processing ends.

As described above, this embodiment calculates the motor driving command value by subtracting the current motor position obtained by subtracting the cam moving amount from the current focus position, from the target motor position in the previously stored zoom-motor position data. Thereby, driving of the focus driver 110 can be properly controlled. This configuration can reduce the overall length of the interchangeable lens 100 and suppress the delay in focus correction during zooming.

Third Embodiment

Next follows a description of a third embodiment according to the present invention. This embodiment is also an embodiment for explaining a specific example of a driving control based on the motor driving command value described in the first embodiment. The first embodiment calculates the motor driving command value for positioning the focus lens 104 at a desired position (final target focus position) after the predetermined time passes every first control period according to the flowchart of FIG. 6. This embodiment describes the focus lens driving control performed at the second control period after the motor driving command value is calculated and before the movement of the focus lens according to the motor driving command value is completed. The second control period is shorter than the first control period.

Figure 11:
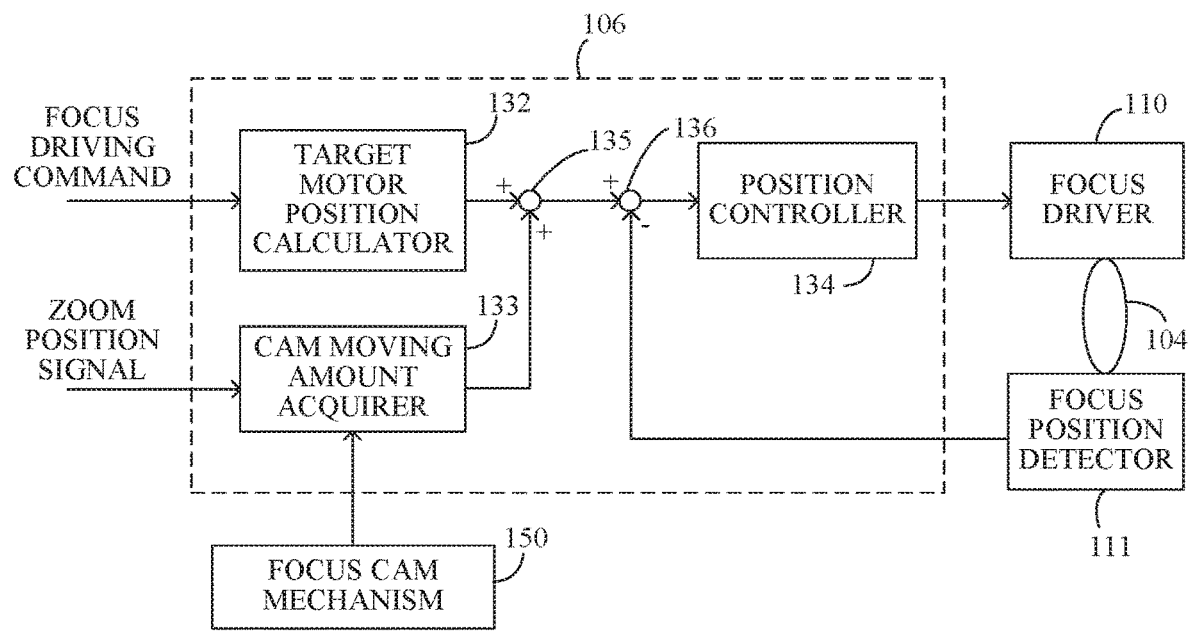
FIG. 11 is a block diagram illustrating a configuration of a lens driving controller according to the first embodiment.

In this embodiment, those elements, which are corresponding elements in the first embodiment, will be designated by the same reference numerals. FIG. 11 illustrates a specific configuration example of the lens controller 106 illustrated in the first embodiment. The lens controller 106 includes a target motor position calculator 132, a cam moving amount acquirer 133, a position controller 134, an adder 135, and a subtractor 136.

The target motor position calculator 132 generates a target motor position (second target driving position) as a target driving position of the focus driver 110 (motor movable part 122) within the second control period, in response to a focus driving command given from the camera body 200. The cam moving amount acquirer 133 receives a zoom position signal from the zoom position detector 108. Then, from the zoom-cam moving amount data illustrated in FIG. 3, the cam moving amount by the focus cam mechanism 150 corresponding to the rotation operation amount (or the zoom position) of the zoom operation unit 105 is acquired.

The adder 135 generates a target focus position (second target focus position) as a target position (in-focus position) of the focus lens 104 within the second control period by adding the target motor position and the cam moving amount to each other. The subtractor 136 subtracts the focus position detected by the focus position detector 111 from the second target focus position to generate a focus position deviation, and outputs it to the position controller 134. The position controller 134 includes, for example, a PID controller, and calculates the motor driving amount within the second control period of the focus driver 110 and the motor driving speed within the second control period for moving the focus lens 104 to the target focus position from the focus position deviation. The calculated motor driving amount and motor driving speed are input to the focus driver 110, and the focus driver 110 is driven accordingly to drive the focus lens 104.

Figure 12:
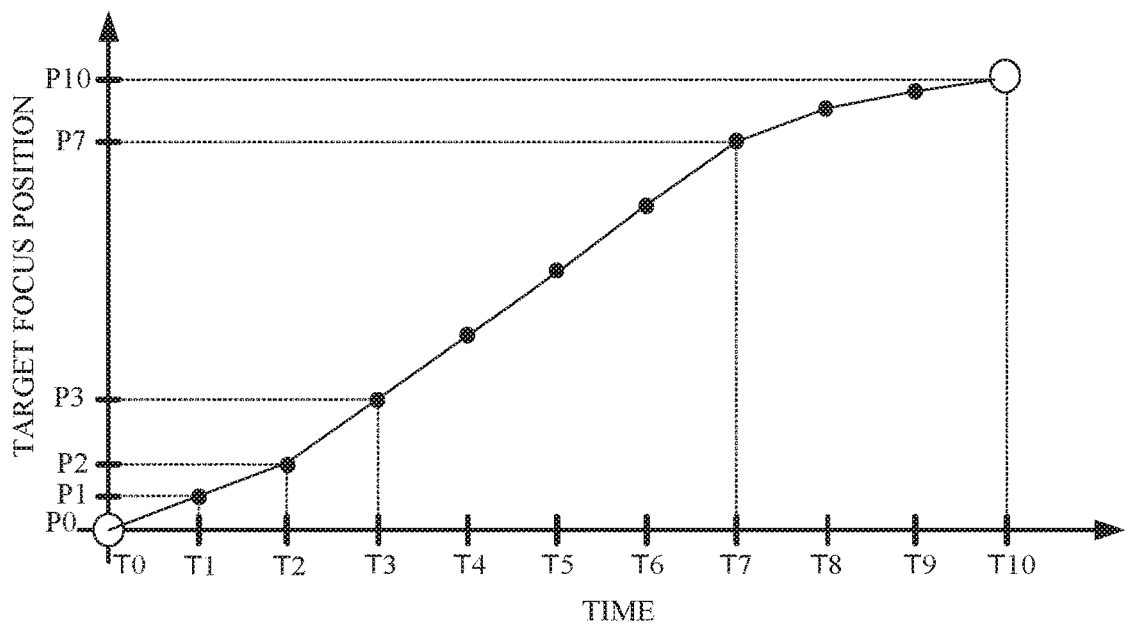
FIG. 12 explains a method of generating a target lens position according to the first embodiment.
Figures 13A, 13B:
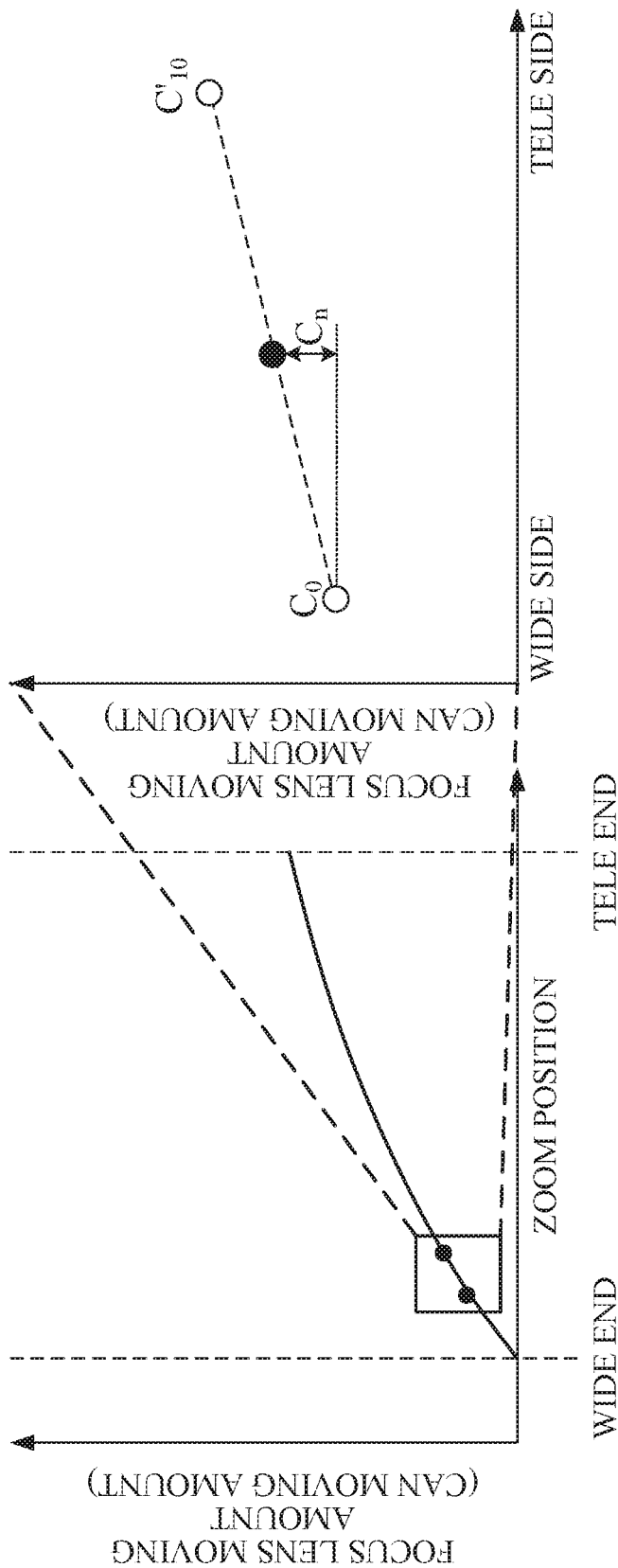
FIGS. 13A and 13B explain a method of calculating a cam moving amount according to the first embodiment.
Figure 14:
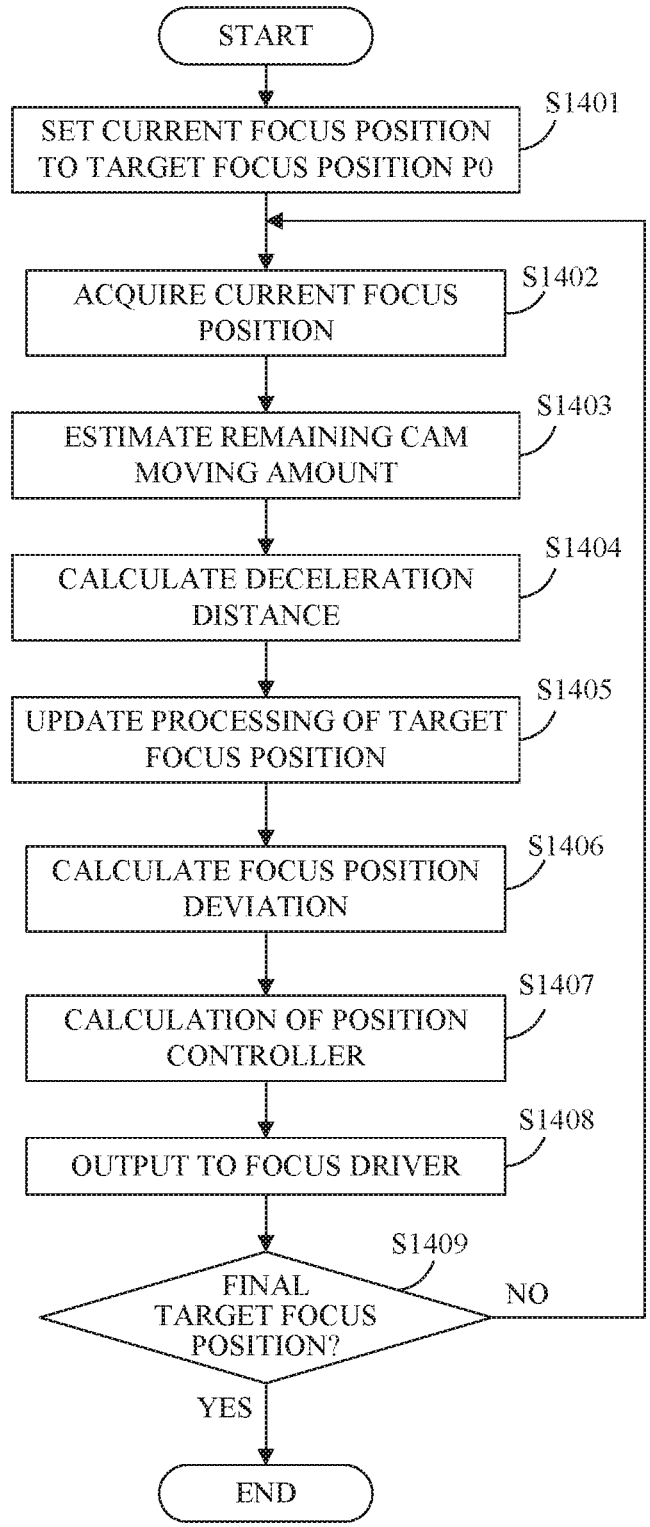
FIG. 14 is a flowchart showing processing performed by the lens driving controller according to the first embodiment.

Referring now to FIGS. 12 to 14, a detailed description will be given of the procedure for generating the target focus position by the target motor position calculator 132, the cam moving amount acquirer 133, and the adder 135. FIG. 12 illustrates a locus of the target focus position when the focus lens 104 moves from a position $P_0$ to a position $P_{10}$. The position $P_0$ indicates a focus position when the focus driving command is received (at time $T_0$), and the positions $P_1$ to $P_9$ indicate the target focus positions at times $T_1$ to $T_9$, respectively. The position $P_{10}$ indicates a final target focus position (first target focus position) at the end of driving the motor. The final target focus position has a value determined in S604 in the flowchart in FIG. 6 according to the first embodiment. Time Tn (n=0, 1, 2, . . . , 10) indicates the second control period of the lens controller 106, and FIG. 12 illustrates that the focus lens 104 has reached the final target focus position in 10 periods.

FIGS. 13A and 13B illustrate changes in the zoom position and the cam moving amount when the focus lens 104 illustrated in FIG. 12 is driven. FIG. 13A illustrates a moving amount (here, a cam moving amount) of the focus lens 104 when zooming is performed between two specific points in the entire zoom range from the wide-angle end to the telephoto end. FIG. 13B is an enlarged view of the above two specific points in FIG. 13A. The cam moving amount at the start of driving of the focus driver 110 is set to $C_0$, and the cam moving amount in the control period n during driving has $C_n$ as a relative amount by setting $C_0$ to a reference. The cam moving amount at the end of driving has $C_{10}$. $C'_{10}$ in the figure represents the estimated cam moving amount calculated from the estimated zoom position (step S603 in FIG. 6) estimated when the motor driving command value is generated.

A flowchart in FIG. 14 shows a control of the focus driver 110 by the lens controller 106 according to this embodiment. The lens controller 106 moves the focus lens 104 to the final target focus position by repeatedly performing S1402 to S1409 of this processing for each second control period.

Upon receiving the focus driving command, the lens controller 106 (target motor position calculator 132) sets the current focus position to the initial position $P_0$ of the target focus position within the second control period in the step S1401.

In the step S1402, the lens controller 106 acquires the current focus position (current position of the focus lens 104) from the focus position detector 111.

Next, in the step S1403, the lens controller 106 (cam moving amount acquirer 133) acquires the cam moving amount $C_n$ (second moving amount) corresponding to the current zoom position, and calculates the remaining amount of cam moving amount up to the position C'10 (remaining cam focus moving amount) using the following expression (4).

Remaining cam focus moving amount=$C'_{10}$-$C_n$ (4)

Next, in the step S1404, the lens controller 106 calculates a distance (deceleration distance) by which the focus lens 104 travels until it stops due to a predetermined deceleration from the current motor driving speed of the focus driver 110. The current motor driving speed will be described later. For example, in the uniform deceleration (negative acceleration) motion, the deceleration distance can be calculated from the values of the current motor driving speed and uniform deceleration.

Next, in the step S1405, the lens controller 106 determines whether or not to execute the deceleration processing for the focus driver 110 based on the current focus position, the remaining cam focus moving amount, and the deceleration distance. When the deceleration processing is not executed, the target focus position within the second control period is updated. Whether or not to execute the deceleration processing is determined by the following expression (5).

Current target focus position $P_n$+remaining cam focus moving amount+deceleration distance≥$P_{10}$ (5)

In other words, when the focus position obtained by adding the remaining cam focus moving amount and the deceleration distance to the current target focus position P arrives at or beyond the final target focus position $P_{10}$ determined in the step S604 in FIG. 6, the lens controller 106 executes the deceleration processing. When the focus position has not yet reached the final target focus position $P_{10}$, the deceleration processing is not executed and the target focus position is updated using the following expressions (6) to (8).

$$P_{n+1}=P_0+M_{n+1}+C_n \quad (6)$$

$$M_{n+1}=M_n+V_{n+1}\times T \quad (7)$$

$$V_{n+1}=V_n+\alpha \times T \quad (8)$$

$V_n$ represents a motor driving speed in the n-th period, a represents an acceleration, and T represents a calculation period of the feedback calculation (or a second control period). The target value of the motor driving speed is updated by the expression (8). Thus, the lens controller 106 performs acceleration processing at a predetermined acceleration a until the motor driving speed of the focus driver 110 reaches the motor driving speed calculated in the step S606 in FIG. 6. When the motor driving speed of the focus driver 110 reaches the motor driving speed calculated in the step S606, the lens controller 106 stops the acceleration processing (by setting α=0), and sets the target values for the subsequent motor driving speeds to a fixed value.

$M_n$ in the expression (7) represents a target motor position (second target driving position) in the n-th period. The target motor position calculator 132 calculates the target motor position when the focus driver 110 is driven at the motor driving speed $V_n$, for each second control period T by setting $M_0$=0 in the expression (7).

The target focus position within the second control period is updated by the expression (6). The target motor position $M_{n+1}$ calculated by the target motor position calculator 132 and the cam moving amount $C_n$ acquired by the cam moving amount acquirer 133 are added to the focus initial position $P_0$ by the adder 135, and thereby the target focus position (second target focus position) $P_{n+1}$ is calculated.

Next, in the step S1406, the lens controller 106 (subtractor 136) calculates the focus position deviation by subtracting the current focus position from the target focus position (second target focus position) updated in the step S1405.

Next, in the step S1407, the lens controller 106 (position controller 134) calculates the motor driving amount and motor driving speed in the current period from the focus position deviation, and outputs them to the focus driver 110 in the step S1408. Thereby, the focus lens 104 is moved to the target focus position updated in the step S1405.

Finally, in the step S1409, the lens controller 106 determines whether or not the target lens position $P_n$ calculated in the step S1405 has reached the final target focus position $P_{10}$, and if it has reached it, the processing ends. If it has not reached, the flow returns to the step S1402 to continue updating the target focus position. By repeatedly performing the processing from the step S1402 to the step S1405 every second control period T, a locus of the target focus position is generated in the second control period from the initial focus position $P_0$ to the final target focus position $P_{10}$ as illustrated in FIG. 12.

Similar to the first embodiment, this embodiment controls driving of the focus driver 110 by subtracting the cam focus moving amount from the difference between the current focus position and the target focus position (in-focus position), and properly controls the focus driver 110.

Fourth Embodiment

Next follows a description of a fourth embodiment according to the present invention. This embodiment also serves as an embodiment for explaining a specific example of driving control based on the motor driving command value described in the second embodiment. The second embodiment calculates, every first control period according to the flowchart of FIG. 10, the motor driving command value for positioning the focus lens 104 at the desired position after the predetermined time passes. This embodiment discusses the focus lens driving control that is performed in the second control period after the motor driving command value is calculated and before the movement of the focus lens according to the motor driving command value is completed. The second control period is shorter than the first control period.

Figure 15:
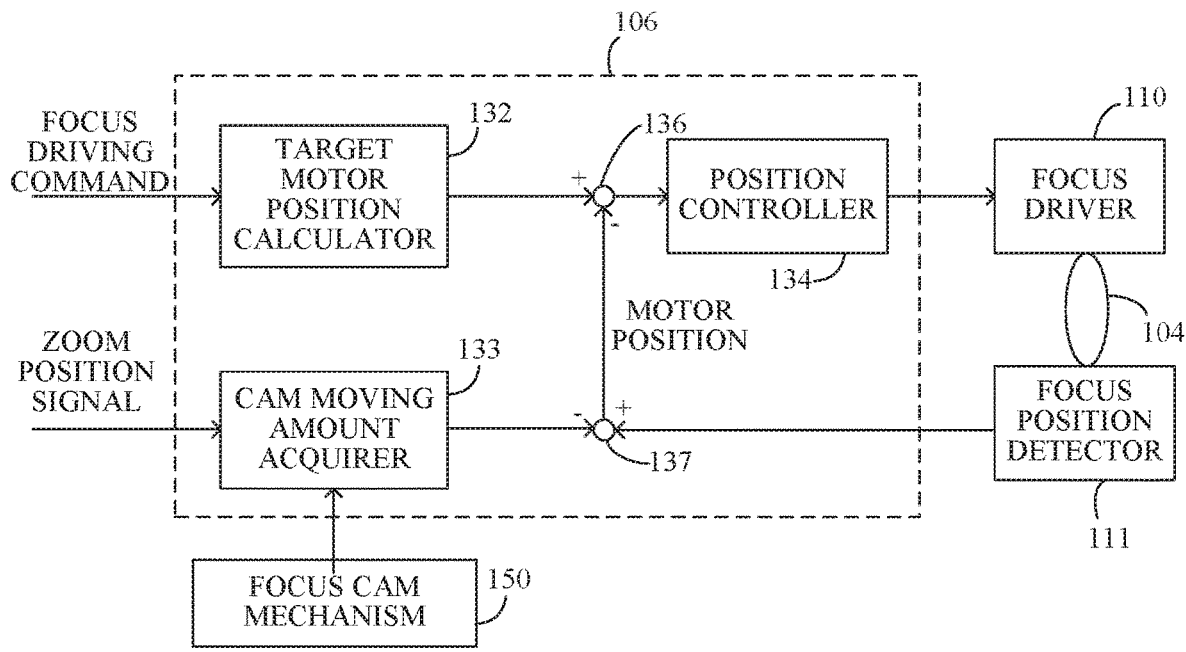
FIG. 15 is a block diagram illustrating a configuration of a lens driving controller according to the second embodiment.

In this embodiment, those elements, which are corresponding elements in the above embodiments, will be designated by the same reference numerals. FIG. 15 illustrates a specific configuration example of the lens controller 106 in FIG. 1. The lens controller 106 includes a target motor position calculator 132, a cam moving amount acquirer 133, a position controller 134, and subtractors 136 and 137.

The lens controller 106 calculates the motor position by subtracting the cam moving amount from the focus position detected by the focus position detector 111 by the subtractor 137. The target motor position calculator 132 calculates the target motor position (second target driving position) in the second control period using the expressions (7) and (8) described in the third embodiment. At this time, the motor driving command value calculated in S1006 in FIG. 10 is used. The subtractor 136 subtracts the motor position (current position) from the target motor position in the second control period from the subtractor 137 to calculate the motor position deviation.

The third embodiment generates the motor driving amount and motor driving speed in this period based on a deviation between the focus position detected by the focus position detector 111 and the target focus position within the second control period calculated in the step S1405. On the other hand, this embodiment generates the motor driving amount and motor driving speed in this period based on a deviation between the current motor position obtained by subtracting the cam moving amount from the focus position detected by the focus position detector 111 and the target motor position within the second control period.

Figure 16:
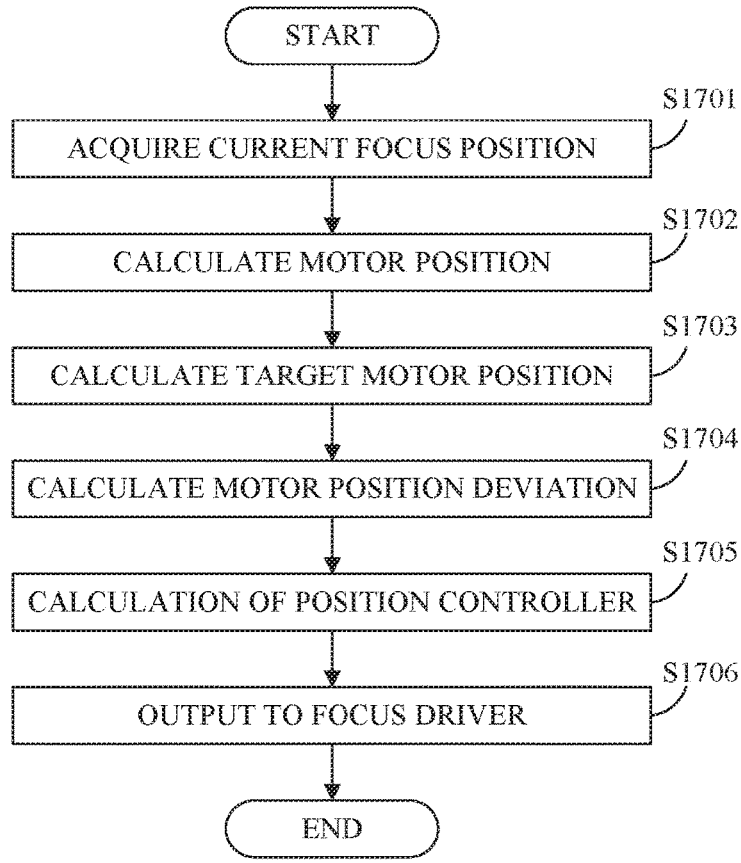
FIG. 16 is a flowchart showing processing performed by the lens driving controller according to the second embodiment.

A flowchart in FIG. 16 shows processing in which the lens controller 106 generates a target motor position and controls the focus driver 110 according to this embodiment. The lens controller 106 can drive the motor position to the target motor position (the target motor position determined in the step S1004 in FIG. 10) by repeatedly performing this processing for each second control period T.

First, in the step S1701, the lens controller 106 acquires the current focus position from the focus position detector 111.

Next, in the step S1702, the lens controller 106 (subtractor 137) subtracts the cam moving amount acquired by the cam moving amount acquirer 133 from the detected focus position, and calculates the current motor position.

Next, in the step S1703, the lens controller 106 (target motor position calculator 132) calculates the target motor position (second target driving position) in the second control period based on expressions (7) and (8).

Next, in the step S1704, the lens controller 106 (subtractor 136) subtracts the current motor position calculated in S1702 from the target motor position calculated in S1703, and calculates a motor position deviation.

Next, in the step S1705, the lens controller 106 (position controller 134) calculates the motor driving amount and motor driving speed in this period from the motor position deviation. In the step S1706, the calculated motor driving amount and the motor driving speed in the current period are output to the focus driver 110. Thereby, the focus driver 110 (motor movable part 122) is driven to the target motor position calculated in the step S1703. Then, the focus lens 104 is moved to the in-focus position by repeatedly performing the processing in FIG. 16 until the motor position reaches the target motor position determined in the step S1004.

This embodiment subtracts the current motor position from the target motor position in the previously stored zoom-motor position data and controls driving of the focus driver 110, thereby properly controlling the focus driver 110.

In the descriptions according to the third and fourth embodiments, the cam moving amount acquirer 133 acquires the cam moving amount according to the zoom position using the previously stored memory zoom-cam moving amount data. Alternatively, there may be provided a sensor (movable part detector) for measuring the position (motor position) of the motor movable part 122 relative to the motor base part 121 in the focus driver 110, and the measured motor position may be subtracted from the detected current focus position to calculate the cam moving amount.

The third and fourth embodiments move the focus lens 104, but are not limited to the focus lens, and may move a movable lens by the same configuration and processing as those of the third and fourth embodiments. The third and fourth embodiments may use a motor as the second driver instead of the focus cam mechanism.

The first to fourth embodiments control driving of the lens in the interchangeable lens 100, but similar to the first to fourth embodiments, the lens driving may be controlled in the lens integrated image pickup apparatus as an optical apparatus.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processor (CPU), microprocessor (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each of the above embodiments can satisfactorily control driving of a first driver in an optical apparatus that moves a lens such as a focus lens through the first driver as well as moving the first driver.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-185698, filed on Oct. 9, 2019, which is hereby incorporated by reference herein in its entirety.

What is claimed is:

1. An optical apparatus comprising:
a first driver configured to move a focus lens in an optical axis direction;
a second driver configured to move a first driver in the optical axis direction; and
a controller configured to control driving of the first driver according to a moving amount of the first driver by the second driver.

2. The optical apparatus according to claim 1, wherein the optical apparatus moves the focus lens during zooming using both the first driver and the second driver,
wherein the controller determines a first target focus position that is a target position of the focus lens using first data relating to an in-focus position of the focus lens corresponding to the zoom position and an estimated zoom position that is estimated to be a zoom position after a predetermined time passes, and
wherein the controller controls driving of the first driver using the first target focus position and a first moving amount that is estimated to be a moving amount of the first driver by the second driver after the predetermined time passes.

3. The optical apparatus according to claim 2, further comprising a position detector configured to detect a position of the focus lens moved by both the first driver and the second driver,
wherein the controller calculates a driving amount of the focus lens by the first driver based on the position of the focus lens detected by the position detector, the first target focus position, and the first moving amount, and controls driving of the first driver based on the driving amount.

4. The optical apparatus according to claim 1, wherein the optical apparatus moves the focus lens using both the first driver and the second driver during zooming,
wherein the first driver includes a movable part configured to move the focus lens,
wherein the controller determines a first target driving position that is a target position of the focus lens within a movable range of the focus lens in the first driver using second data relating to an in-focus position of the movable part of the first driver corresponding to the zoom position, and an estimated zoom position that is estimated to be a zoom position after a predetermined time passes, and
wherein the controller controls driving of the first driver using the first target driving position and a second moving amount as a moving amount of the first driver by the second driver.

5. The optical apparatus according to claim 4, further comprising a position detector configured to detect a position of the focus lens moved by both the first driver and the second driver,
wherein the controller calculates a current position of the focus lens within a movable range of the focus lens in the first driver using the second moving amount and the position of the focus lens detected by the position detector, and controls driving of the first driver based on the first target driving position and the current position.

6. The optical apparatus according to claim 1, further comprising a position detector configured to detect a position of the focus lens moved by both the first driver and the second driver,
wherein the controller controls driving of the first driver using the position of the focus lens detected by the position detector and a second target focus position that is a target position of the focus lens, and
wherein the second target focus position is determined based on a second moving amount as a moving amount of the first driver by the second driver and the second target driving position that is the target position of the focus lens within a movable range of the focus lens in the first driver.

7. The optical apparatus according to claim 6, wherein the controller controls driving of the first driver based on a deviation between the position of the focus lens detected by the position detector and the second target focus position.

8. The optical apparatus according to claim 1, further comprising a position detector configured to detect a position of the focus lens moved by both the first driver and the second driver, wherein the controller controls driving of the first driver using a second target driving position that is a target position of the focus lens within a movable range of the focus lens in the first driver, and a current position of the focus lens within a movable range of the focus lens in the first driver, and wherein the current position is calculated using a second moving amount as a moving amount of the first driver by the second driver, and the position of the focus lens detected by the position detector.

9. The optical apparatus according to claim 8, wherein the controller controls driving of the first driver based on a deviation between the current position and the second target driving position.

10. The optical apparatus according to claim 6, further comprising a movable part detector configured to detect a position of a movable part relative to a base part in the first driver, wherein the controller acquires the second moving amount using the position of the focus lens detected by the position detector and the position of the movable part detected by the movable part detector.

11. The optical apparatus according to claim 1, wherein the first driver includes a motor, and wherein the second driver includes a cam mechanism configured to move the first driver by a cam.

12. The optical apparatus according to claim 1, wherein each of the first driver and the second driver includes a motor.

13. A control method of an optical apparatus that includes a first driver configured to move a focus lens in an optical axis direction, and a second driver configured to move the first driver in the optical axis direction, the control method comprising the steps of:

acquiring a moving amount of the first driver by the second driver; and controlling driving of the first driver according to the moving amount of the first driver by the second driver.

14. A non-transitory computer-readable storage medium storing a computer program that causes to execute a control method a computer in an optical apparatus that includes a first driver configured to move a focus lens in an optical axis direction, and a second driver configured to move the first driver in the optical axis direction, wherein the control method comprising the steps of:

acquiring a moving amount of the first driver by the second driver; and controlling driving of the first driver according to the moving amount of the first driver by the second driver.

* * * * *